UNITED STATES PATENT OFFICE.

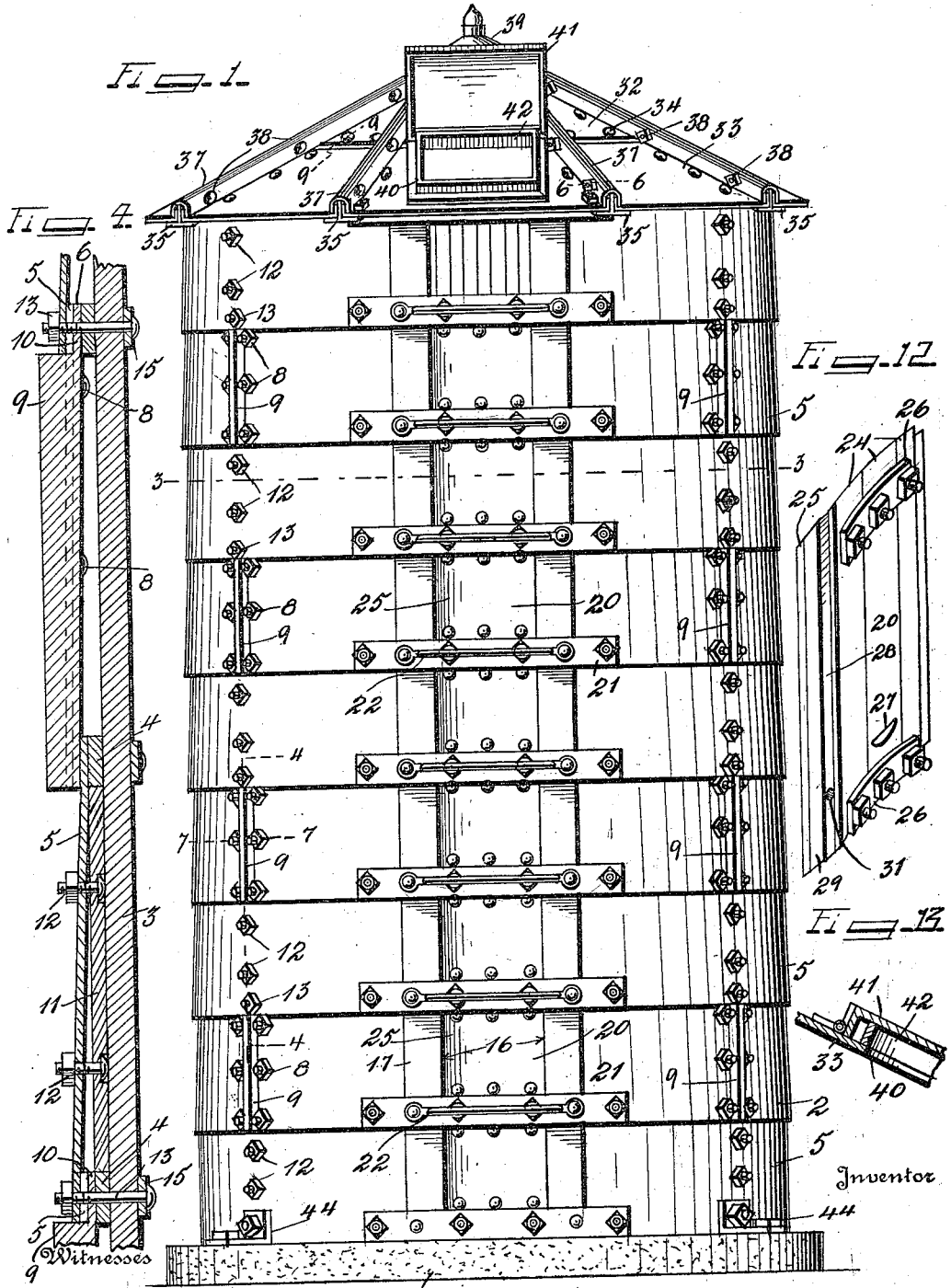

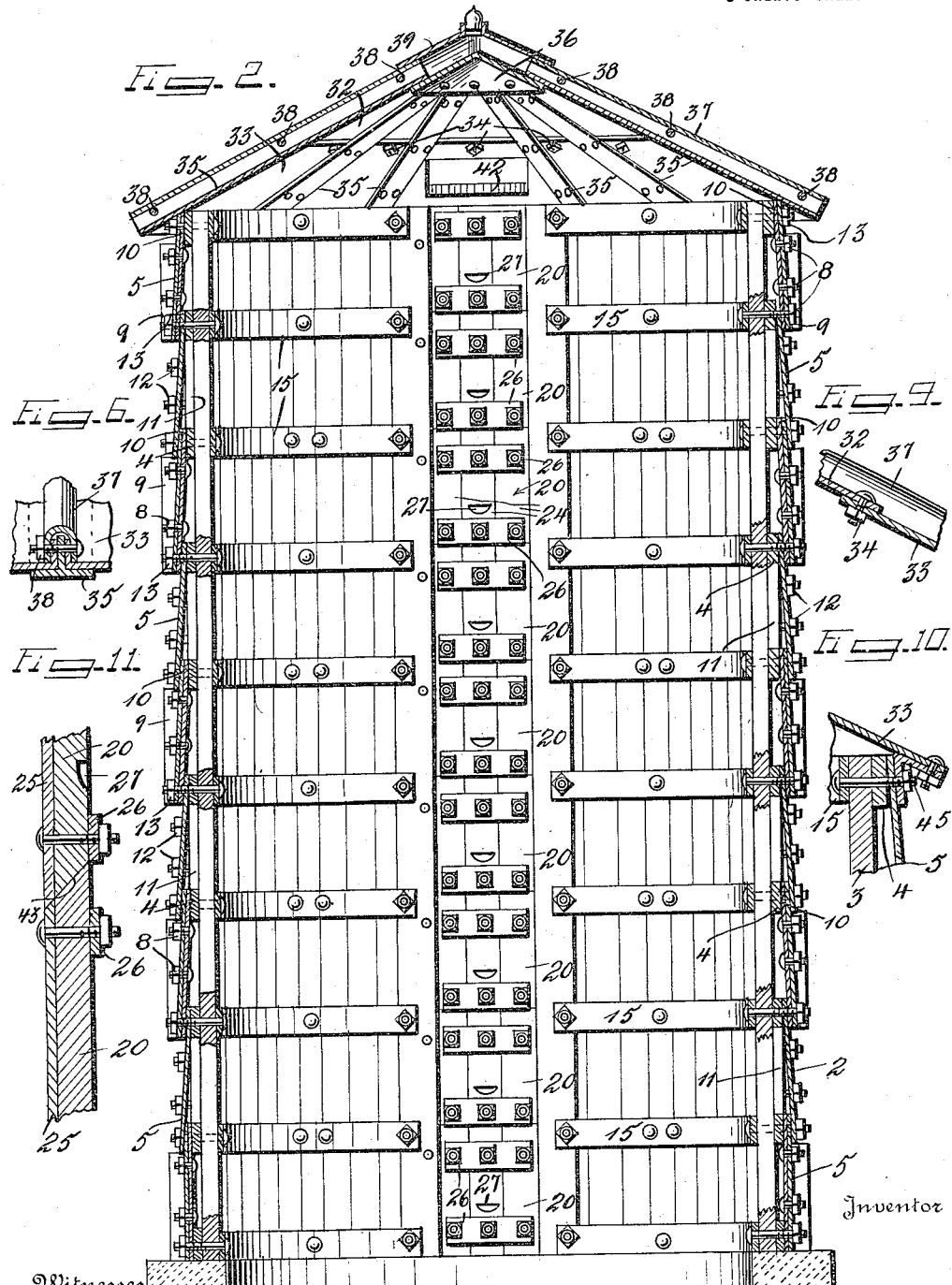

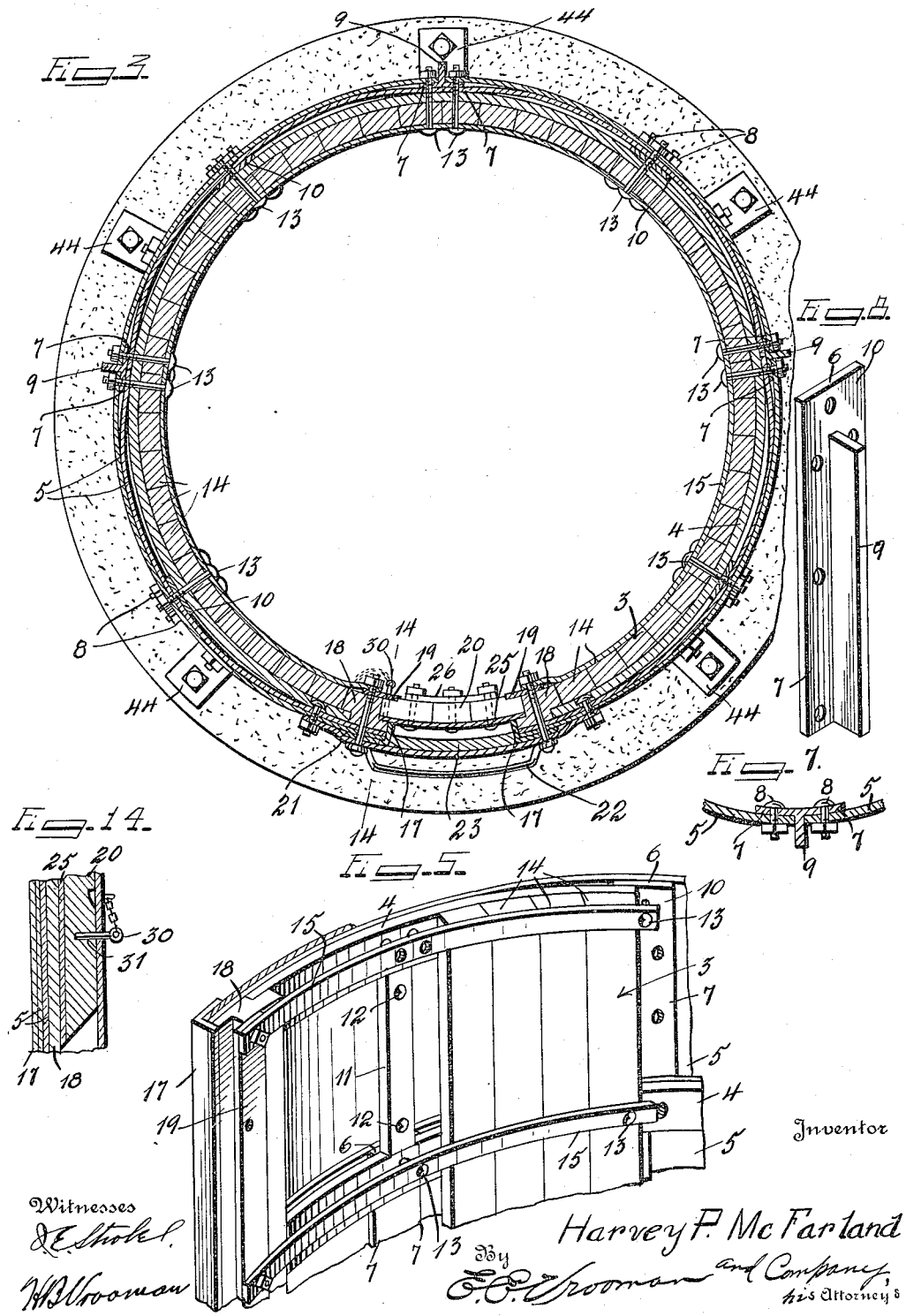

HARVEY P. McFARLAND, OF OQUAWKA, ILLINOIS.

SILO.

1,145,202.  Specification of Letters Patent.  Patented July 6, 1915.

Application filed December 3, 1914. Serial No. 875,369.

*To all whom it may concern:*

Be it known that I, HARVEY P. MCFARLAND, a citizen of the United States of America, residing at Oquawka, in the county of Henderson and State of Illinois, have invented certain new and useful Improvements in Silos, of which the following is a specification, reference being had therein to the accompanying drawing.

This invention relates to silos and has for its object the production of a simple and efficient silo which is a combination steel and wood structure for producing a fire proof and lightning proof storage tank or silo for silage.

Another object of this invention is the production of a strong and durable silo wherein the silage may be cured against the wooden lining and in this way will be held out of contact with the metal outer casing.

A still further object of this invention is the production of a simple and efficient means for facilitating the removal of the silage from the silo when so desired.

With these and other objects in view this invention consists of certain novel combinations, constructions, and arrangements of parts as will be hereinafter fully described and claimed.

In the accompanying drawings:—Figure 1 is a front elevation of the silo. Fig. 2 is a central vertical section thereof. Fig. 3 is a section taken on line 3—3, of Fig. 1. Fig. 4 is an enlarged vertical section taken on line 4—4 of Fig. 1. Fig. 5 is a sectional perspective view showing the construction of the wall of the silo. Fig. 6 is an enlarged transverse sectional view taken on line 6—6, of Fig. 1. Fig. 7 is an enlarged sectional view taken on line 7—7, of Fig. 1. Fig. 8 is a detail perspective of one of the connecting and reinforcing T irons used in the construction of the silo. Fig. 9 is a section taken on line 9—9, of Fig. 1. Fig. 10 is an enlarged section showing the manner of attaching or supporting the roof upon the silo. Fig. 11 is a vertical section through a plurality of the slidable doors carried by the silo showing the manner in which the doors fit over each other or abut against the respective edges thereof. Fig. 12 is a detail perspective of one of the doors showing the inner face thereof. Fig. 13 is an enlarged section showing the manner of attaching the trap door upon the top of the silo through the roof of the silo. Fig. 14 is a vertical section taken on line 14—14, of Fig. 3 showing the manner in which the sliding doors are held in a set position.

By referring to the drawings it will be seen that 1 designates the base which is preferably formed of concrete or other plastic material for producing an efficient support for the silo. This base 1 may be embedded in the ground upon which the silo is placed as is usual with such devices.

The silo comprises an outer metallic casing 2 and an inner wooden lining 3 which are held in spaced relation by means of the annular bands 4 extending around the silo and between the inner and outer walls.

The outer wall 2 of the silo comprises a plurality of series of overlapping segmental metallic plates 5. The metallic plates of each series are adapted to overlap the lower series of plates as clearly illustrated in Fig. 1 so as to easily shed the rain or other moisture which might come in contact with the outer face of the silo. The different segmental plates of each series have their abutting ends engaging the T irons 6, which T irons are provided with laterally extending flanges 7 upon which the abutting ends of the segmental plates are firmly held by means of the bolts 8, which structure is clearly illustrated in Figs. 1, 7 and 8. The rib portion 9 of the angle irons 6 terminates short of the upper end of the angle irons for producing a projecting tongue 10, which projecting tongue is adapted to fit under the adjacent overhanging segmental plate and constitute an efficient means for anchoring the T iron 9 in engagement with the segmental plate placed just above the T iron. It should be understood that these segmental plates of each series are connected at different points with respect to each other so as to have the angle irons 9 of one series of plates in staggered relation relative to the angle irons of the adjacent series of plates. In this manner a very tight, compact and rigid structure will be produced. It should be further understood that by means of the overlapping plates just described, the silo or outer casing thereof may be readily shifted and placed in a small crate and also may be readily assembled when desired. It should be further understood that any number of these plates may be employed for the purpose of extending the height of the silo according to the desire of the constructor placing the silo in position.

As above described and also as clearly illustrated in detail in Fig. 4, the inner and outer walls 2 and 3 are held in spaced relation by means of the annular bands 4, which annular bands 4 extend around the inner face of the outer casing 2 and the outer face of the inner casing 3, these bands 4 being placed in such a position as to be directly under the overlapping portions of the respective series of overlapping plates. In order that the plates may be properly reinforced throughout the entire height of the silo, a filler block 11 is placed directly under or between the respective ends of the T irons 9, and these filler blocks 11 are firmly held in engagement with the overlapping segmental plates by means of the bolts 12 clearly illustrated in Figs. 1 and 4. A bolt 13 is carried by the projecting tongue 10 of each angle iron 9 for firmly anchoring the angle iron in engagement with the series of overlapping plates placed just above the angle iron and also in engagement with one of the spacing bands 4 as illustrated clearly in Fig. 4. The structure is also clearly illustrated in Fig. 5.

The inner casing 3 is formed of a plurality of closely fitted wooden staves 14, which staves are firmly held in their proper assembled position by means of the bands 15. These bands 15 may be formed of any suitable or desired material, such as for instance wood or metal according to the desire of the constructor of the silo. It is preferable, however, to employ wood, although metal may be used, but by employing wood the acid produced by the silage will not be likely to cause any chemical action between the silage and the metal parts of the silo. It is desired to point out that the inner casing 3 will produce an air tight structure, in view of the fact that the dampness created by the green silage will cause the staves 14 to swell and fit compactly together and prevent the admission of air between the particles of silage. It, however, is not necessary that the outer casing 2 should be made air tight, and in fact, it is preferable that a little bit of air should enter between the inner and outer casings to allow a free circulation and permit the inner face of the outer casing 2 to be kept in a dry condition, thereby preserving the same against rust. The admission of air is made possible owing to the fact that the air may enter over the overlapping joints of the segmental plates 5 forming the outer casing 2.

A doorway 16 is employed upon the silo and upon each side of the doorway is mounted the angle iron 17 carried by the outer casing and the inner casing carries a pair of substantially Z-shaped wooden beams 18, one beam being placed upon either side of the doorway and directly in the rear of the angle plates 17. A track plate 19 is also carried and fixedly secured to the inner face of each beam 18 and constitutes a track upon which the slidable doors 20 are adapted to work. A plurality of transversely extending metal cleats 21 are secured to the outer face of the outer casing 2, and metallic straps 22 are carried by these transversely extending cleats 21 for constituting a ladder to permit a person to ascend to the top of the silo when so desired. A wooden cleat 23 is carried by each of the transversely extending cleats 21 for the purpose of reinforcing the same.

The doors which are used in connection with the present silo are made for a vertical sliding movement, and each door comprises a plurality of staves 24 which are firmly held together by being bolted to a metallic lining 25 and also to the transversely extending tie members 26. A notch 27 is formed in each door for the purpose of allowing the operator to catch hold of the door in order to raise the same. A channel 28 is formed along each side edge of the door, and thereby produces a projecting tongue 29 upon each side edge of the door for the purpose of traveling upon the track plates 19 carried by the inner faces of the beams 18. One of the track plates 19 is provided with a plurality of apertures formed therein for the purpose of receiving the pin 30 which pin is adapted to pass through one of the track plates 19 and fit in the aperture 31 formed upon the door 20, and in this manner hold the door in the desired elevated position to allow access to be had to the interior of the silo.

In order that the silo may be properly unloaded the top door is preferably removed from the doorway and each succeeding door is then raised to its desired position to allow the silage to be removed from the silo when so desired.

A metallic top of a dome-like structure is carried by the silo and comprises a plurality of converging plates forming a shingle-like formation, the top plates overlapping the lower plates in a manner somewhat similar to the manner of the overlapping feature of the overlapping plates of the outer casing 2. The top comprises a plurality of top plates 32 and a plurality of lower plates 33 which are held in firm engagement with each other by means of the bolts or rivets 34 passing through the overlapping edges thereof. The respective side edges of each of the plates 32 and 33 are flanged outwardly and are adapted to fit snugly around the radiating T irons 35, which radiating T irons are firmly secured to the central cap 36. In order that the joints of the roof may be properly protected, a substantially inverted U-shaped bead 37 is placed thereover and firmly held in engagement therewith by means of the transversely extending bolts 38. A cap 39 is placed over the uppermost part of the roof of the silo to constitute an efficient protector therefor.

A trap door frame work 40 is carried by the roof and a door 41 is adapted to normally close the trap door frame 40 and prevent the entrance of weather into the top of the silo. The framework 40 is formed directly over the doorway 16 so as to allow the doors 20 of the silo to be readily removed when so desired. The framework 40 is provided with a flanged rim 42 so as to prevent the entrance of rain or other moisture into the top of the silo, and thereby shed the water from the opening through the trap door frame.

By carefully considering Fig. 11 it will be seen that the doors 20 are provided with chamfered abutting edges 43 to constitute a tight closure at the junction of the several alined doors.

The outer casing is securely held in engagement with the base 1 by means of the angle plates 44. The roof of the silo is also held upon the outer casing by means of angle plates or brackets 45.

From the foregoing description it will be seen that a very simple and efficient combination steel and wooden silo has been produced which will allow the silage to be cured directly against the wooden lining and at the same time will be fireproof and lightning proof. The metal outer lining will also protect the wooden inner lining from the weather, and in this way greatly lengthen the life of the inner lining of the silo.

It should be further understood that the angle T irons which are used in the construction of the outer casing and also the roof constitute an efficient fastening means for the several segmental plates which are detachable, providing any plate should be at any time found necessary to be removed and be replaced by a new plate. It should be further noted that in view of the fact that the flange portion 9 terminates short of one end of the angle iron 9 that this will constitute a stop or gage for limiting the downward movement of the segmental plate placed in the next above section.

It should be further understood that in view of the fact that the silo doors are vertically slidable, it will not be necessary for a person removing the silage from the silo to first raise the silage and then force the same out through the door opening, as is the case with the door swinging inwardly of the silo. In the present structure the doors may be easily raised and the silage easily pushed out of the door opening.

Having thus described the invention what is claimed as new, is:—

A silo comprising an outer metallic casing and a wooden inner casing, means for holding said casings in spaced relation, said outer casing comprising a plurality of tiers of overlapping segmental plates, each tier of plates comprising a plurality of metallic segmental plates, an angle iron for connecting the abutting ends of said segments, each angle iron comprising a plurality of side flanges and a centrally located rib, said centrally located rib fitting between the abutting ends of said segmental plates and terminating short of one end of said angle iron for producing a tongue, said tongue fitting under the overlapping edge of the next above segmental plate, and means passing through said plate and angle iron for firmly connecting the same to said plates.

In testimony whereof I hereunto affix my signature in presence of two witnesses.

HARVEY P. McFARLAND.

Witnesses:
JAMES MEIR,
H. T. RUNDORFF.

Copies of this patent may be obtained for five cents each, by addressing the "Commissioner of Patents, Washington, D. C."